United States Patent

Claussen

[15] 3,683,734
[45] Aug. 15, 1972

[54] ROLLER BEARING
[72] Inventor: Uwe Claussen, Munich, Germany
[73] Assignee: Bayerische Berg-Hutten-und Salzwerke AG, Munich, Germany
[22] Filed: June 25, 1970
[21] Appl. No.: 49,829

[52] U.S. Cl. .................83/345, 83/343, 83/663, 83/665, 83/674, 83/698
[51] Int. Cl. .................................B26d 1/40
[58] Field of Search........83/698, 665, 663, 674, 331, 83/343, 345, 337, 346

[56] References Cited

UNITED STATES PATENTS

| | | |
|---|---|---|
| 3,566,734 | 3/1971 | Robinson.............83/663 X |
| 518,647 | 4/1894 | Hess.................83/343 X |
| 1,577,619 | 3/1926 | Gammeter............83/346 X |
| 2,625,224 | 1/1953 | Garrett..............83/665 X |

FOREIGN PATENTS OR APPLICATIONS 206,407  2/1909  Germany..............83/665

Primary Examiner—Frank T. Yost
Attorney—James E. Nilles

[57] ABSTRACT

A bearing for a rotating roller or the like in which, for example, the roller is eccentric or provided for eccentric extensions and periodically subjected to stress from the outside, said bearing being provided with at least one bearing point which is located between the ends of the roller and a distance therefrom, and which bearing then supports the roller when stress occurs between its ends. The invention finds particular utility in bearings for rollers of cutting machines such as cross cutters.

18 Claims, 11 Drawing Figures

PATENTED AUG 15 1972
3,683,734

INVENTOR:
UWE CLAUSSEN
BY: James E. Nilles
ATTY

Fig. 7
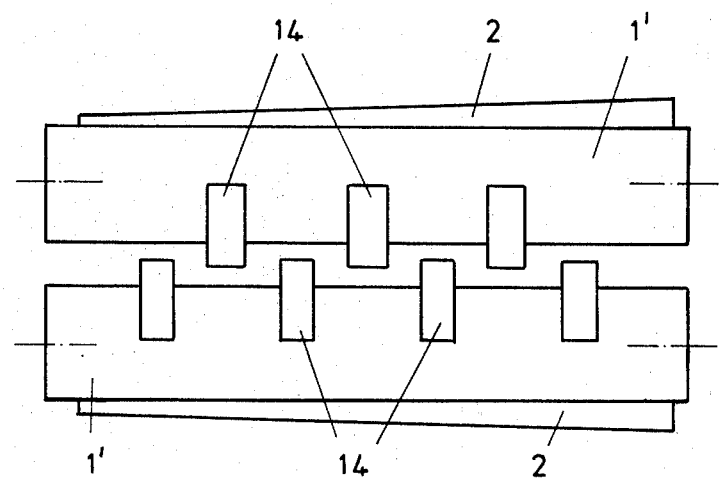
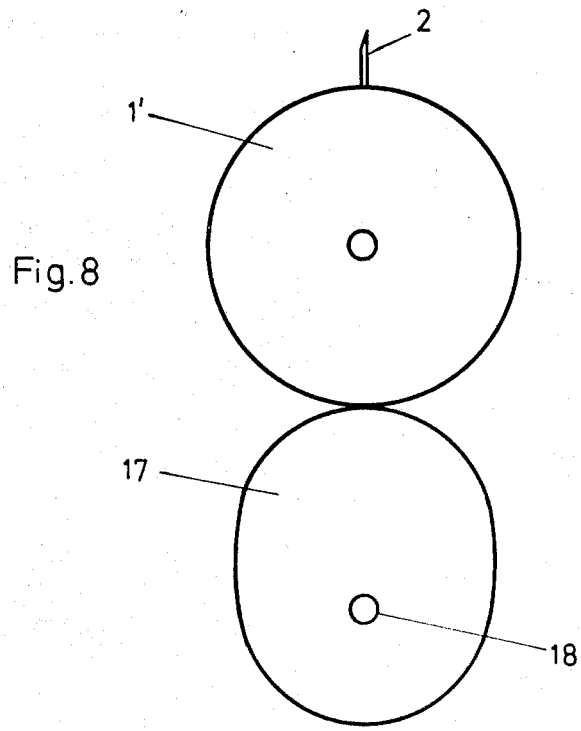
Fig. 8
INVENTOR:
UWE CLAUSSEN
BY:
James E. Nilles
ATT'Y

ROLLER BEARING

BACKGROUND OF THE INVENTION

The invention relates to a bearing of a rotating roller, for example one which is eccentric or provided with eccentric extensions or periodically stressed from outside, particularly a cutting roller of a cross-cutter.

Rollers of cutting machines which must be brought into contact with a material to be machined at least along part of the length of the rollers cannot exceed a specific maximum deflection during machining, particularly during stress associated with a machining operation, since otherwise machining of the material along the entire length of the roller can no longer be ensured. This problem occurs particularly in the case of cross-cutters i.e., devices in which a band-shaped material (e.g. paper, cardboard, sheet metal) is moved between rotating cutting rollers and cut into sections of predetermined length. Each cutting roller is provided with a cutter extending over the entire length and projecting over the periphery, said cutter rotating with the roller. When the cutter meets the band-shaped material to be cut, the cutting roller is stressed from outside and subjected to deflection. In order to minimize the deflection of the roller during the cutting action, attempts have been previously made to construct the rollers so that they have maximum rigidity and are rotatably mounted at both ends. However, this construction gives rise to a particularly heavy roller. The roller therefore has a high momentum thereby necessitating an unfavorably high moment of acceleration to move said roller. A high performance is necessary to move these rollers and in addition the upper working speed is limited.

SUMMARY OF THE INVENTION

The problem underlying the invention is to provide a bearing of the type mentioned at the beginning which is simple and robust in construction and can be economically manufactured and which minimizes the deflection of the roller when it is mounted on the bearing and subjected to stress.

This problem is solved in accordance with the invention in that the bearing is provided with at least one bearing point which is located between the ends of the roller some distance therefrom and supports the roller when stress occurs between the two ends.

In contrast to previously known bearings, the bearing according to the invention supports the roller at at least one point between the ends of the roller and therefore at a point where the roller is usually subjected to maximum stress. The bearing according to the invention can be designed so that the roller is supported at a plurality of points distributed over its length. Moreover the roller can be supported at both ends. The deflection of the mounted roller is minimized by the bearing according to the invention even during heavy stress without the roller having to be particularly rigid in design. Therefore, rollers of relatively simple construction and having little rigidity can be used in combination with the bearing according to the invention. Such rollers have an advantageously low momentum so that only a low moment of acceleration is required to move the rollers and therefore the driving power can be kept to a minimum.

An advantageous embodiment of the bearing according to the invention is obtained if the roller is hollow in design and a rigid carrier extends through the interior of the hollow roller, the two ends of said carrier projecting outwards beyond the ends of the hollow roller and being securely supported, and if at least at one point between its ends the hollow roller is supported indirectly by interposed bearing members or directly on the carrier during stress. In this embodiment the roller can either be supported on the carrier at several points distributed along the length of said carrier, or it can be supported thereon by the entire length of the carrier. The carrier can be extremely rigid in design and cannot rotate with the roller. The hollow rollers supported on the carrier can be very simple in design, have a low momentum and can therefore be driven at low power and at a high rotational speed.

The bearing can be designed so that a bearing member which is arranged between the ends of the hollow roller and supports the latter from inside during stress is mounted on the carrier. In this connection an advantageous embodiment is obtained if each bearing member is in the form of a roller bearing which is inwardly supported on the carrier and outwardly supported on the inner wall of the hollow roller. The support of the hollow roller on the carrier can be effected so that the hollow roller can be subjected to stress from all directions and is evenly supported around the circumference of the carrier, or so that support is only effected in the area where the hollow roller is subjected to stress from the outside. The latter support can be used when the roller is constantly subjected to stress in a specific fixed direction. This is the case, for example with rotating rollers of cross cutters in which the rollers are subjected to stress while the cutter is in contact with the material to be cut and are therefore periodically moved out of the constant direction relative to the carrier.

A further advantageous embodiment of the previously discussed bearing according to the invention which is suitable for universal support of the hollow roller is obtained if each roller bearing is arranged in the form of a ring of rollers encircling the circumference of the carrier in a circular space between said carrier and the hollow roller and is designed in the form of rollers supported on the carrier and hollow roller.

An embodiment of the bearing according to the invention wherein the hollow roller is only supported against stresses coming from a given direction is obtained if each roller bearing is in the form of a supporting roller or a set of supporting rollers rolling along the inner wall of the hollow roller, said supporting rollers being rotatably mounted on the carrier at a point where stress is exerted on the hollow roller from outside. The bearing can be arranged so that these supporting rollers or sets thereof are provided at intervals along the carrier.

The bearing according to the invention can be advantageously provided with a carrier extending inside a hollow roller so that the carrier extends, only a short distance from the inner wall of the hollow roller, along part of the circumference of said roller where stress is exerted from outside, and that the interior of the carrier is provided with a longitudinally extending flow channel and at least one auxiliary flow channel which branches radially from this flow channel in the direction of the area of stress of the hollow roller and leads to the circumference of the carrier, and that the flow channels are connected to a supply of pressure gas. In the case of this bearing, pressure gas flows out of the connecting channels and through the gap between the carrier and hollow roller so that the latter is cushioned against outer stress by pressure gas. This cushion of pressure gas acts constantly and even when the roller is not subjected to stress.

A bearing according to the invention can be advantageously provided with a gas cushion support so that the interior of the carrier comprises a longitudinally extending flow channel and at least one auxiliary flow channel which branches radially from this first channel in the direction of the area of stress of the hollow roller and leads to the circumference of the carrier, that the mouth of each auxiliary flow channel on the circumference of the carrier is closed in the inoperative position by a spring-loaded ball valve, that the ball of each ball valve projects above the circumference of the carrier to such an extent that a small space is left between the ball and the inner wall of the hollow roller when the latter is unstressed, but that the inner wall of the hollow roller comes into contact with the ball when the hollow roller is subjected to stress and presses it inwards in opposition to the force of the valve spring so that the valve opens, and that the flow channels are connected to a supply of pressure gas. In this embodiment of the bearing the hollow roller is only supported against outer stress at a time when the hollow roller has been deflected under the influence of stress to such an extent that the ball valves are actuated and permit the escape of pressure gas.

The bearing according to the invention can also be advantageously designed so that at least one bearing point is provided between the two ends of the roller in the vicinity of its outer circumference.

The bearing according to the invention is advantageously designed for rollers which during their rotation are subjected to stress from outside on a fixed area of the path of rotation and at a given point on the circumference, particularly for rollers of a cross cutter which are subjected to stress in the vicinity of their cutter during each cutting action, so that the outer circumference of the roller is provided with at least one circular segment extending concentrically and projecting above the wall of the roller, said circular segment lying diametrically opposite the area of stress of the roller and its outer circumference acting as a sliding face, that a corresponding supporting bearing in the form of a circular arc is fixed in a section lying diametrically opposite at the point where the roller is subjected to stress, and so that when the roller rotates the circular segment is located and supported above the arc-shaped supporting bearing during stress. In this bearing a plurality of circular segments can also be arranged at intervals from one another along the roller.

In this connection a bearing according to the invention for the roller of a cross cutter is designed so that each circular segment projects radially further above the circumference of the roller than the cutter. In this manner it is ensured that the cutter does not come into contact with the arc-shaped supporting bearings which cooperate with the circular segments.

In the case of cross cutters there are usually provided two cutter rollers which run parallel to one another and rotate synchronously in the opposite direction. The band-shaped material to be cut is fed between these cutting rollers. The cutters of the two rollers cooperate in the form of scissors to perform the cutting action.

A bearing according to the invention for each roller of a pair of such rollers is designed so that the circular segments of one roller are mounted along the roller at points lying between the circular segments of the other roller.

Another advantageous embodiment of a bearing according to the invention is obtained for a roller which is subjected to stress from outside during each rotation on a given section of the path of rotation and at a given point on the circumference, particularly a roller of a cross cutter subjected to stress in the vicinity of its cutter during each cutting action, in that at least one eccentric disc rotatably mounted about an axle running parallel to the axle of the roller is provided as a bearing, in that the axial distance between the roller and eccentric discs is such that the eccentric disc comes into contact with the circumference of the roller only in the area of maximum eccentricity, in that the eccentric disc can be driven synchronously with the roller so that the eccentric disc is in contact with the roller when the cutter of the roller lies diametrically opposite the point of contact, and in that the eccentric disc also has a path of rotation which, during the phase of movement in which the cutter of the roller projecting above the circumference passes between the rotating axles of the roller and eccentric disc, produces a spacing between the circumferences of the roller and eccentric disc greater than the amount by which the cutter projects above the roller.

This bearing can be further designed so that either a plurality of identical eccentric discs are arranged along the roller to support the latter, or that an eccentric roller extending along the entire length of the roller is provided as a bearing.

The bearing according to the invention can also be in the form of a magnetic bearing. For example, a plurality of rectified magnetic poles are arranged at intervals along a rigid carrier extending through a hollow roller, said poles cooperating with opposite poles arranged on the inner wall of the hollow roller in its area of stress and during the phase of stress on the roller a magnetic support of the roller is obtained by the mutual repulsion of the poles.

Other features and advantages of the invention are shown in the following description of several preferred embodiments in connection with the drawings.

BRIEF DESCRIPTION OF THE DRAWINGS

FIG. 7 shows a side view of a development of the bearing as shown in FIG. 6;

FIG. 8 shows a seventh embodiment of a bearing according to the invention.

DESCRIPTION OF THE PREFERRED EMBODIMENT

Figure 1:
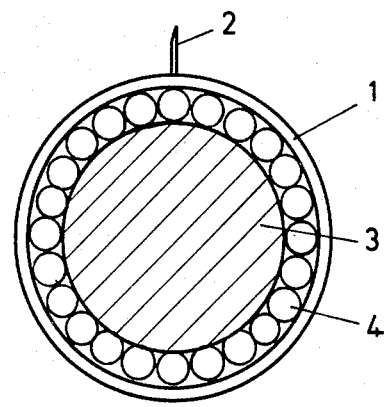
FIG. 1 shows a partial section of a first embodiment of the bearing according to the invention for a cutting roller of a cross cutter.
Figure 2:
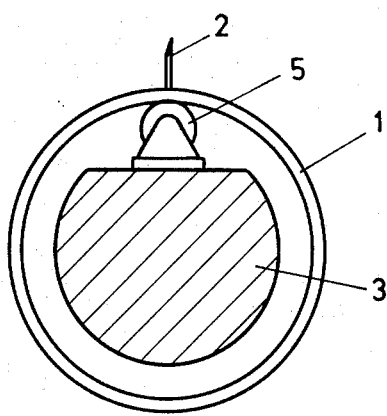
FIG. 2 shows a second embodiment of a bearing according to the invention.
Figure 3:
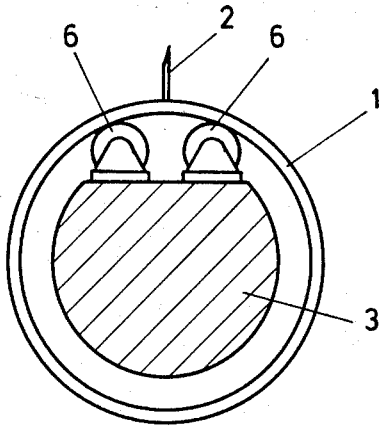
FIG. 3 shows a third embodiment of a bearing according to the invention.
Figure 9:
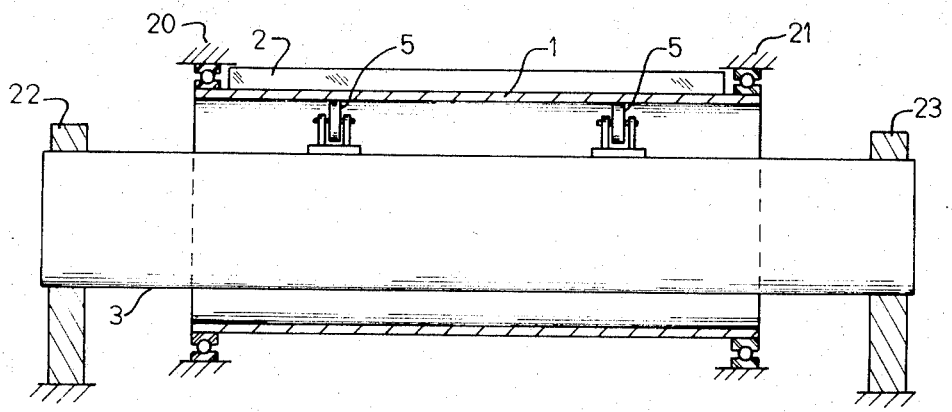
FIG. 9 is a longitudinal section of the roller mounting shown in FIG. 2.

Bearings according to the invention for cutting rollers of cross cutters are shown in FIGS. 1 to 3. The cutting roller 1 is hollow in all three bearings. At its axially opposite ends of the roller 1 is supported for rotation on its axis by rotary end supports 20 and 21 (FIG. 9). The end supports are effective to prevent radial displacement of the roller, particularly on the inward stress from the outside to which the roller becomes periodically obstructed due to cutting resistance encountered by a cutting blade 2 which is secured to and projects radially outward from the roller. Inside the roller 1 extends a rigid carrier 3, the two ends of which project outwards beyond the ends of the hollow roller and are rigidly supported on stationary bracket 22 and 23 (FIG. 9). An intermediate space remains between the hollow roller 1 and the carrier 3.

In the roller mounting according to FIG. 1, the carrier is in the form of a circular cylinder and arranged coaxially to the hollow roller. In the circular space between the roller and the carrier a ring of supporting rollers 4 distributed about the circumference of the carrier is provided at at least one point along the length of the roller some distance from its ends, which supporting rollers can be mounted for example, in a cage which is not shown for the sake of clarity, as is known practice with roller bearings. The supporting rollers 4 support the hollow roller on the carrier 3. The bearing afforded by the rollers 4 as shown in FIG. 1 can be subjected to inward stress from all directions.

In the case of the roller mounting according to FIGS. 2 and 3 the hollow roller 1 is likewise supported on the carrier 3 by means of roller bearings, but each roller bearing is in the form of a supporting roller 5 (FIG. 2) in rolling contact with the inner wall of the hollow roller or a set comprising at least two supporting rollers 6 (FIG. 3) arranged successively in the direction of the carrier circumference. The supporting roller 5 or the set of supporting rollers 6 is mounted in a section on the carrier 3 where stress is exerted on the hollow roller 1 from outside. In the embodiments shown in FIGS. 2 and three the supporting roller 5 or the supporting rollers 6 are arranged so that the hollow roller 1 is supported when the cutter 2 comes into contact with the band-shaped material to be cut which extends through the cross-cutter but is not shown for the sake of clarity. The bearings according to FIGS. 2 and 3 can be designed so that a plurality of rollers 5 or sets of rollers 6 are spaced at intervals from one another along the length of the carrier so that the hollow roller 1 is evenly supported over its entire length.

Figure 4:
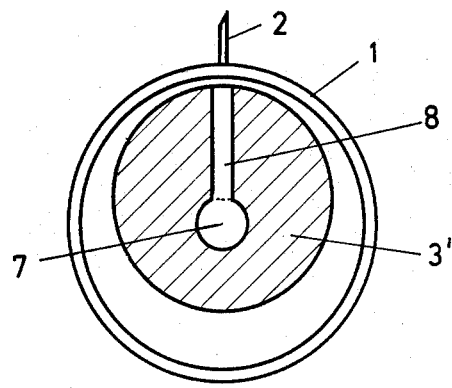
FIG. 4 shows a fourth embodiment of a bearing according to the invention.
Figure 10:
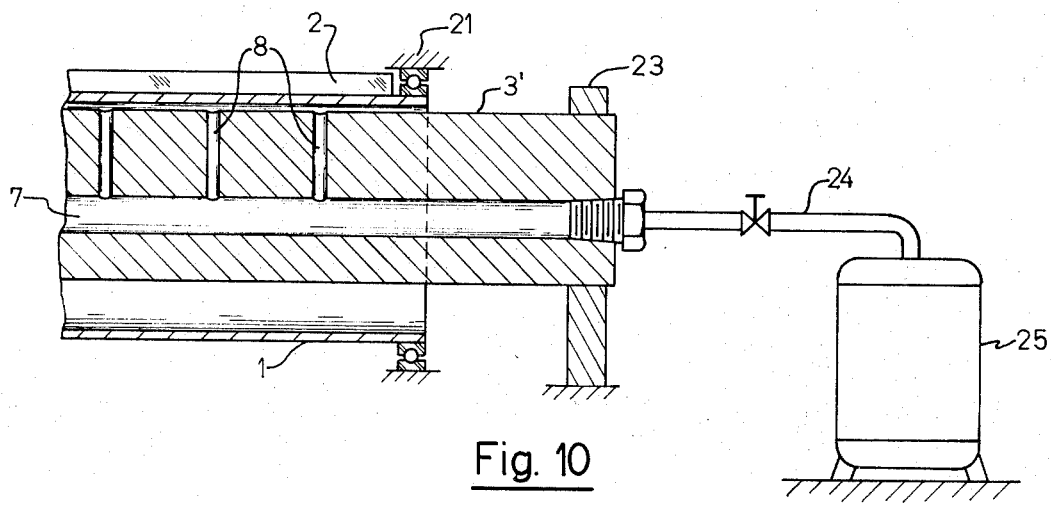
FIG. 10 is a longitudinal section of the roller mounting shown in FIG. 4.

FIG. 4 shows a practical embodiment of a roller mounting according to the invention wherein the support of a roller of a cross cutter is effected by means of a cushion of pressure gas. The cutting roller 1 is also in the form of a hollow roller through which extends a rigid and securely mounted carrier 3'. The interior of the carrier 3' is provided with a longitudinally extending flow channel 7 and at least one auxiliary flow channel 8 which branches radially from the first channel in the direction toward the area of inward stress upon the hollow roller 1 and terminates at the circumference of the carrier. The carrier 3' extends through part of the circumference of the hollow roller where the latter is subjected to stress from the outside, at a short distance from the inner wall of the hollow roller 1. The flow channel 7 is connected by conduit means 24 (FIG. 10) to a source of fluid pressure such as a pressure gas tank 25, for example a compressed air pipe, which is not shown for. The pressure gas, for example compressed air, flows through the flow channel 7 and the auxiliary channels 8 into the gap between the carrier 3 and the hollow roller 1 and there forms a cushion of compressed air which supports the hollow roller 1 in opposition to outer stress. This support is effective not only at one point, but over a large longitudinal section of the hollow roller 1. The bearing can be designed so that a plurality of auxiliary channels 8 are provided at intervals along the carrier 3 as illustrated by FIG. 10. The bearing according to FIGS. 4 and 10 operates constantly, i.e., even when the roller is not subjected to stress.

Figure 5:
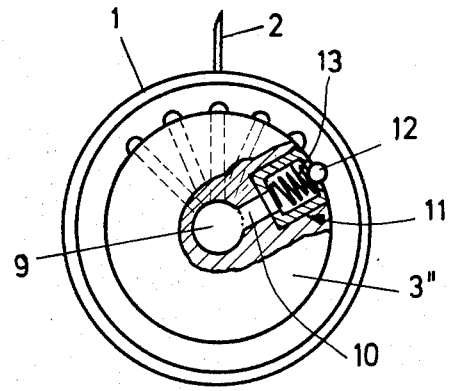
FIG. 5 shows a fifth embodiment of a bearing according to the invention.
Figure 11:
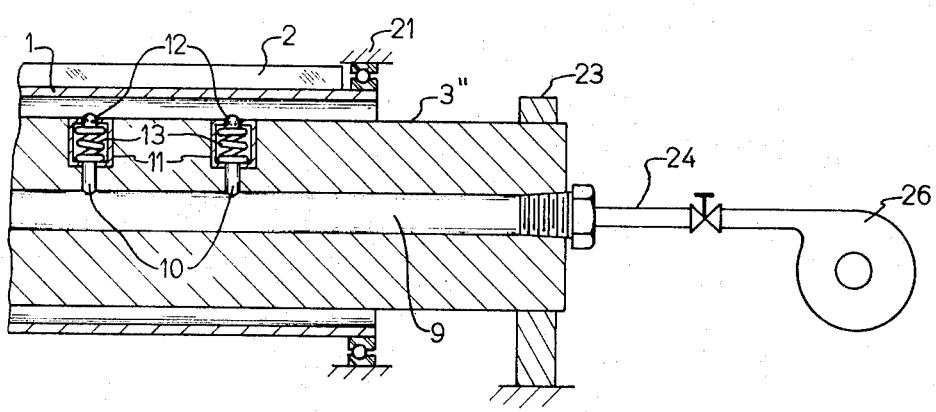
FIG. 11 is a longitudinal section of the roller mounting shown in FIG. 5.

FIGS. 5 and 10 show an embodiment of a roller mounting according to the invention wherein a cushion of pressure gas is likewise used to support the roller. The roller is also hollow in this embodiment and a rigid carrier 3" extends inside the hollow roller and its outwardly projecting ends are securely supported. Inside the carrier 3" extends a flow channel 9 from which at least one auxiliary channel 10 branches radially in the direction toward the area of inward stress on the hollow roller and leads to the circumference of the carrier 3". In the roller mounting according to FIG. 5 a plurality of auxiliary flow channels 10 is provided at intervals along the length of the carrier, said auxiliary flow channels being distributed through an angle in such directions that a further area of stress is applied to the hollow roller. The mouth of each auxiliary flow channel 10 on the circumference of the carrier 3" is closed in the inoperative position by a spring-loaded ball valve 11. The ball 12 of each ball valve projects above the circumference of the carrier 3" to such a extent that when the hollow roller is not subjected to stress a small intermediate space is left between the ball 12 and the inner wall of the hollow roller, but when the hollow roller is subjected to inward stress its inner wall comes into contact with the ball and presses it inwards in opposition to the force of the valve spring 13 so that the valve 11 then opens. The flow channel 9 and therefore the auxiliary channels 10 are permanently connected by conduit means 24 to a source of fluid pressure for instance a blower 26 (FIG. 11). The mounting according to FIGS. 5 and 11 is only effective when the hollow roller 1 exceeds a given deflection under stress. The mounting is more economical than the mounting according to FIG. 4 since smaller compressed gas or air losses occur.

Figure 6:
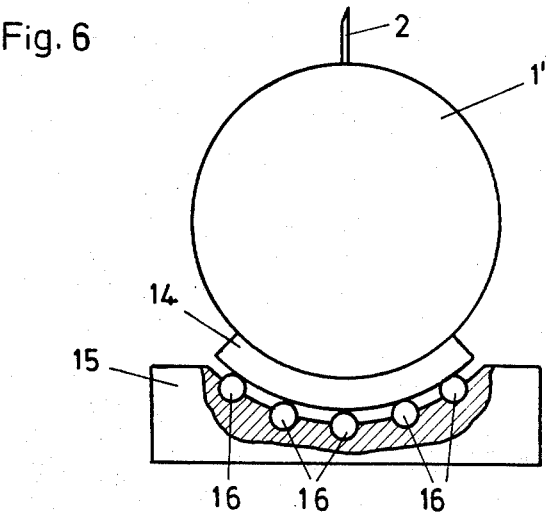
FIG. 6 shows an axial view of a sixth embodiment of a bearing according to the invention.

FIG. 6 shows an embodiment of a roller mounting according to the invention in which the roller is supported not from the inside but from the outside. At least one bearing point is provided in the vicinity of the outer circumference on the cutting roller 1' of a cross cutter between its two ends. The mounting shown in FIG. 6 is suitable for rollers which during their rotation are subjected to stress from outside at a given point on the path of rotation and at a given point on the circumference, and are particularly suitable for a cutting roller of a cross cutter which is subjected to stress in the vicinity of its cutter during each cutting operation. On the outer circumference of the roller 1' there is provided at least one concentric ring segment 14 which projects above the wall of the roller and is mounted diametrically opposite the area of stress on the roller, in the present case opposite the point to which the cutter 2 is fastened. The outer circumference of the segment 14 is designed as a sliding face. A corresponding arc-shaped supporting bearing is securely mounted on a section lying diametrically opposite the point where the roller is subjected to stress so that when the roller rotates the ring segment 14 is located and supported on the arc-shaped bearing 15 during stress. The arc-shaped bearing 15 contains a plurality of supporting rollers 16 mounted in an arc to support the ring segment 14 which moves along the roller 1 during stress.

The mounting of a single roller of a cross cutter is shown in FIG. 6. FIG. 7 shows a pair of rollers of a cross cutter wherein the two rollers are mounted parallel to one another and synchronously driven in opposite directions. The band-shaped material to be cut is guided between the rollers. The two cutters 2 cooperate in a scissor-like manner to perform each cutting operation. The two rollers carry ring segments 14 and are mounted by means of a bearing as shown in FIG. 6. In order to prevent the rollers from obstructing one another during rotation, the ring segments are arranged along the length of one roller in a staggered relationship to the ring segments along the other roller (FIG. 7). In FIG. 7 the two rollers are shown in a stage of movement in which the two cutters are spaced apart by the maximum distance. When the roller is in motion the cutters are moved towards one another and the ring segments 14 of the two rollers are rotated outwards and then come into contact with corresponding arc-shaped supporting bearings, one of which is shown in FIG. 6 and is designated by reference numeral 15.

In the mounting according to FIGS. 6 and 7 each ring segment 14 extends radially further above the circumference of the roller 1' than the cutter 2.

FIG. 8 shows another embodiment of a roller mounting according to the invention. This mounting is likewise suitable for rollers which during rotation are subjected to stress from the outside at a given point on the path of rotation and at a given point on the circumference, i.e., particularly suitable for cutting rollers of cross-cutters which are subjected to stress in the vicinity of the cutter during each cutting operation. At least one eccentric disc 17 which is rotatably mounted about an axle 18 running parallel to the axle of the roller is provided as a load transmitting element which is cooperable with the cutting roller 1 intermediate its ends so as to rotatably brace said roller against radially inward stress independently of the end supports 20 and 21. The axial distance between the roller 1' and the eccentric disc 17 is such that the eccentric disc only comes into contact with the circumference of the roller in the area of maximum eccentricity (see FIG. 8). The eccentric disc 17 can be synchronously driven with the roller 1' so that the eccentric disc 17 comes into contact with the roller when the cutter 2 of the roller is located diametrically opposite the point of contact. The eccentric disc 17 is in the form of a cam having a contour which, during the stage of movement in which the cutter 2 projecting above the circumference of the roller 1' passes between the rotating axles of the roller 1' and the eccentric disc 17, produces a spacing between the circumferences of the roller and eccentric disc which is greater than the amount by which the cutter 2 projects above the roller 1'. In this roller mounting a plurality of eccentric discs 17 can be arranged at intervals along the length of the roller 1' so that the roller may be supported as evenly as possible. An eccentric supporting roller extending along the roller 1' can also be provided. In this embodiment of the roller mounting according to the invention the roller 1' is supported by the eccentric discs 17 when forces which deflect the roller 1' come into play. In the embodiment shown in FIG. 8 the roller 1' is supported when the cutter 2 is in cutting contact with the band-shaped material which extends through the cross cutter, but is not shown and transmits the cutting power to the roller 1'.

The invention is not limited to the described embodiments. A roller mounting according to the invention can be designed, for example, so that the rollers to be supported are provided with ring segment bearings as shown in FIGS. 6 and 7, as well as an eccentric disc bearing as shown in FIG. 8.

All the features shown in the description and drawings, including the constructional details, may also be essential to the invention in any desired combination.

What is claimed is:

1. The combination of a rotating roller, particularly a cutting roller of a cross cutter, which is periodically subjected to radial inward stress from the outside, and a rotary supporting structure for said roller comprising rotary end supports operatively associated with said roller so as to prevent radial displacement thereof by said inward stress, and radial load transmitting means cooperable with said roller intermediate its ends so as to rotatably brace said roller against said radially inward stress independently of said end supports.

2. The combination as set forth in claim 1 wherein the roller is designed as a hollow roller; wherein said mounting structure comprises a rigid carrier extending through the interior of said hollow roller, and support means rigidly sustaining the two ends of said carrier outward beyond the ends of said hollow roller, and wherein said load transmitting means are operatively interposed between said carrier and said roller.

3. The combination as set forth in claim 2 wherein said load transmitting means comprise at least one bearing member mounted on said carrier between the ends of said hollow roller for cooperative engagement with said roller from the inside during inward stress upon the latter.

4. The combination as set forth in claim 2 wherein said load transmitting means comprise a plurality of bearing members arranged at axial intervals along that carrier for cooperative engagement with said roller from the inside during inward stress upon the latter.

5. The combination as set forth in claim 4 wherein each of said bearing members is in the form of a roller bearing which is inwardly supported on said carrier and bears outwardly upon the inner wall of said hollow roller.

6. The combination as set forth in claim 5 wherein said roller bearing comprises a ring of rollers which are arranged in a circle around the circumference of said carrier in supported relation thereto and in supporting relation to said roller.

7. The combination as set forth in claim 5 wherein each of said roller bearings is in the form of a supporting roller cooperable with the inner wall of said hollow roller and rotatably mounted on said carrier at a point where said hollow roller is subjected to said inward stress from the outside.

8. The combination as set forth in claim 5 wherein each of said roller bearings comprises a set of at least two supporting rollers arranged successively in the direction of the carrier circumference for rolling engagement with the inner wall of said hollow roller and rotatably mounted on said carrier at a point at which said hollow roller is subjected to said inward stress from the outside.

9. The combination as set forth in claim 2 wherein said carrier extends only a short radial distance from the inner wall of said hollow roller at least in the circumferential area of the latter where said hollow roller is subjected to said inward stress from the outside, and wherein the interior of said carrier comprises a longitudinally extending flow channel and at least one auxiliary channel which branches radially from said flow channel in the direction toward the area of said inward stress upon said hollow roller and terminating at the circumference of said carrier, and conduit means connecting said flow channels in pressure receiving relation to a source of fluid pressure.

10. The combination as set forth in claim 2 wherein the interior of said carrier comprises a longitudinally extending flow channel and at least one auxiliary flow channel which branches radially from said longitudinal flow channel in the direction toward the area of said inward stress upon said hollow roller and terminating at the circumference of said carrier, and a spring loaded ball valve in the mouth of each auxiliary flow channel on the circumference of said carrier normally operative to close the auxiliary channel, the ball of each valve projecting above the circumference of said carrier to such an extent that, when said hollow roller is not subjected to said inward stress, a small intermediate space remains between said ball and said inner wall of said hollow roller, and so that when the hollow roller is subject to said inward stress, its inner wall comes into contact with said ball and presses it inwards in opposition to the closing pressure of said valve, whereby said valve is opened; and conduit means connecting said longitudinally extending flow channel with a source of fluid pressure.

11. The combination as set forth in claim 1 wherein said load transmitting means are arranged exteriorly of said roller so as to afford at least one bearing point in the vicinity of the outer circumference of said roller and between its opposite ends.

12. The combination as set forth in claim 11 wherein said load transmitting means comprise at least one concentric ring segment on the outer periphery of said roller which extends above the wall of said roller and is arranged diametrically opposite the area of said inward stress upon the roller, the outer circumference of said ring segment being designed as a sliding face; and complementary arc shaped supporting means for said ring element securely mounted in a position lying diametrically opposite the point where the roller is subjected to said inward stress, so that when the roller rotates, it is braced against said inward stress by cooperative engagement of said ring segment with said arc shaped supporting means.

13. The combination as set forth in claim 12 wherein said arc shaped supporting means is provided with an arc shaped sliding face complementary to said sliding face of said ring element.

14. The combination as set forth in claim 12 wherein said arc shaped supporting means is provided with a plurality of supporting rollers mounted in a circular arc for cooperative engagement with said ring segment as the latter moves over said supporting rollers.

15. The combination as set forth in claim 12 wherein said load transmitting means comprise a plurality of ring segments arranged at axial intervals along said roller.

16. The combination as set forth in claim 15 wherein a radially outward extending cutting element is secured to said roller and wherein each ring segment extends radially outward from the circumference of said roller to a greater extent than said cutting element.

17. The combination of a pair of rollers which are each subjected to radial inward stress from the outside at a given point on the path of rotation and at a given point on their respective circumferences, particularly a pair of cutting rollers of a cross cutter which are subjected, respectively, to stress in the vicinity of their cutting elements during each cutting operation, and a rotary mounting structure for said rollers comprising a plurality of ring elements which are arranged at axial intervals along said rollers, respectively, and are arranged diametrically opposite the area of said inward stress upon the respective roller, and said mounting structure further comprising arc shaped supporting means securely mounted, respectively, in positions lying diametrically opposite the points where the rollers are subjected to said inward stress so that when the rollers rotate they are braced by cooperative engagement of said ring segments with said arc shaped supporting means, said ring segments of one roller being arranged axially therealong at points lying between the ring elements of the other roller.

18. In a rotary cutting apparatus, the combination of a cutting roller, a cutting element on said roller projecting outwardly therefrom and subjecting said roller to inward stress during each cutting operation, and a rotary supporting structure for said roller comprising at least one eccentric disc which is rotated synchronously with said roller about an axis spaced radially from and extending parallel to the axis of said roller, the contour of said disc and the spacing of its axis from said roller axis being such that said disc comes into radial load transmitting engagement with said roller in the area of maximum inward stress thereupon during each cutting operation and so that a space between said roller and disc is cleared for the passage of said cutting element therethrough after each cutting operation.

* * * * *